United States Patent
Rasheed

(10) Patent No.: US 8,252,410 B2
(45) Date of Patent: Aug. 28, 2012

(54) CERAMIC COVER WAFERS OF ALUMINUM NITRIDE OR BERYLLIUM OXIDE

(75) Inventor: Muhammad M. Rasheed, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 409 days.

(21) Appl. No.: 12/204,240

(22) Filed: Sep. 4, 2008

(65) Prior Publication Data

US 2009/0068433 A1  Mar. 12, 2009

Related U.S. Application Data

(60) Provisional application No. 60/970,250, filed on Sep. 5, 2007, provisional application No. 60/970,757, filed on Sep. 7, 2007.

(51) Int. Cl.
 *B32B 27/32* (2006.01)
(52) U.S. Cl. .......... 428/220; 501/98.4; 501/96.1
(58) Field of Classification Search .......... 428/209, 428/210, 220, 336; 501/98.4, 96.1; 219/444.1, 219/465.1
See application file for complete search history.

(56) References Cited

U.S. PATENT DOCUMENTS

| | | | |
|---|---|---|---|
| 5,000,113 A | 3/1991 | Wang et al. | |
| 5,240,555 A | 8/1993 | Kilburn | |
| 5,366,585 A | 11/1994 | Robertson et al. | |
| 5,493,305 A | 2/1996 | Wooldridge et al. | |
| 5,810,937 A | 9/1998 | Gupta et al. | |
| 5,895,974 A | 4/1999 | Eytcheson et al. | |
| 6,127,727 A | 10/2000 | Eytcheson | |
| 6,156,686 A * | 12/2000 | Katsuda et al. | 501/96.1 |
| 6,159,333 A | 12/2000 | Gupta et al. | |
| 6,186,661 B1 | 2/2001 | Hevey et al. | |
| 6,328,041 B1 | 12/2001 | Brown et al. | |
| 6,586,783 B2 | 7/2003 | Boursat et al. | |
| 7,060,622 B2 | 6/2006 | Miyamori et al. | |
| 2002/0155262 A1* | 10/2002 | Ito et al. | 428/209 |
| 2002/0158061 A1* | 10/2002 | Ito et al. | 219/444.1 |
| 2004/0097359 A1* | 5/2004 | Hiramatsu et al. | 501/98.4 |

OTHER PUBLICATIONS

Ceram Research, Azom.com Beryllium Oxide; Apr. 3, 2001. <www.azom.com/details.asp?ArticleID=263 >.*
Ceradyne Advanced Technical Ceramics "Typical Properties of Ceradyne Semiconductor Grade Materials," Ceradyne, Inc., (Jun. 2005), http://www.ceradyne.com/uploads/Semiconductor % 20 Property%20Data%206-30-05.pdf.
Notice of First Office Action dated May 21, 2010 for Chinese Patent Application No. 200810135599.4.

* cited by examiner

*Primary Examiner* — Angela Ortiz
*Assistant Examiner* — Ruiyun Zhang
(74) *Attorney, Agent, or Firm* — Patterson & Sheridan, LLP

(57) ABSTRACT

Embodiments of the invention provide a method and apparatus for protecting a susceptor during a cleaning operation by loading a ceramic cover substrate containing either aluminum nitride or beryllium oxide onto the susceptor before introducing the cleaning agent into the chamber. In one embodiment, an aluminum nitride ceramic cover substrate is provided which includes an aluminum nitride ceramic wafer having a thermal conductivity of greater than 160 W/m-K, a circular-shaped geometry having a diameter within a range from about 11 inches to about 13 inches, a thickness within a range from about 0.030 inches to about 0.060 inches, and a flatness of about 0.010 inches or less. The thermal conductivity may be about 180 W/m-K, about 190 W/m-K, or greater. The thickness may be within a range from about 0.035 inches to about 0.050 inches, and the flatness may be about 0.008 inches, about 0.006 inches, or less.

19 Claims, 3 Drawing Sheets

CERAMIC COVER WAFERS OF ALUMINUM NITRIDE OR BERYLLIUM OXIDE

CROSS-REFERENCE TO RELATED APPLICATIONS

This application claims benefit of U.S. Ser. No. 60/970,250, filed Sep. 5, 2007, and U.S. Ser. No. 60/970,757, filed Sep. 7, 2007, which are herein incorporated by reference in their entirety.

BACKGROUND OF THE INVENTION

Embodiments described herein relate to a method and an apparatus for cleaning a processing chamber.

DESCRIPTION OF THE RELATED ART

During a chemical vapor deposition (CVD) process, the reactant gases can create compositions which deposit upon the inside surfaces of the chamber. As these deposits build up, the residues can flake off and contaminate future processing steps. Such residue deposits can also adversely affect other processing conditions such as deposition uniformity, deposition rate, film strength and the like.

Accordingly, processing chambers are typically periodically cleaned to remove the residue material. Typically, etching gases are used to clean the chamber after each process or after a few processes are run through the chamber. After longer periods of time, typically after about 1,000-2,000 wafers have been processed, the chamber is opened up and cleaned by hand using rinse water and clean wipes. Clearly, it is desirable to minimize the amount of cleaning time required in order to improve the throughput of wafers through the processing chamber.

The cleaning using the cleaning gases typically involves a plasma enhanced dry cleaning technique. These techniques require a separate process step which requires introducing the cleaning gases into the chamber, striking a plasma from the cleaning gases, and using the plasma to remove contaminant residues. Typically, fluorine is used as a cleaning gas species. Descriptions of such a cleaning process may be found, for instance, in commonly assigned U.S. Pat. Nos. 4,960,488 and 5,124,958, which are herein incorporated by reference in their entirety.

A disadvantage of the dry cleaning operation is that it contributes to the degradation of the susceptor, which is typically made of aluminum. A susceptor typically has an anodized layer on its surface, which forms some protection. However, during a plasma cleaning process, the fluorine chemistry of the process will penetrate the anodized layer and cause the formation of aluminum fluoride. This usually occurs at point defect sites in the anodized layer on the susceptor. The formation of aluminum fluoride results in formation of nodules, cracks and delamination which, in turn, causes uniformity and particle problems on wafers subsequently placed on the susceptor.

One method for addressing the above degradation of a susceptor is to use a two step cleaning process, as set forth in commonly assigned U.S. Pat. No. 5,158,644, which is incorporated herein by reference. In that two step process, the chamber is first cleaned in an extended state in which the susceptor is lowered to be well spaced from the gas discharge manifold, thus limiting the amount of plasma reaching the susceptor by decreasing the plasma due to the distance between the susceptor and the gas discharge head. With this configuration, the plasma will be somewhat redirected to the grounded walls of the chamber to effect cleaning there. In a second step, the susceptor is moved back up close to the gas discharge head for cleaning of the susceptor itself. The two step process reduces the amount of time the susceptor is exposed to a high intensity plasma.

SUMMARY OF THE INVENTION

Embodiments of the invention provide a method and apparatus for protecting a susceptor during a cleaning operation by loading a ceramic cover substrate containing an aluminum nitride ceramic wafer or a beryllium oxide ceramic wafer onto the susceptor before introducing the cleaning agent into the chamber.

In one embodiment, an aluminum nitride ceramic cover substrate is provided which includes an aluminum nitride ceramic wafer having a thermal conductivity of greater than 160 W/m-K, a circular-shaped geometry containing a diameter within a range from about 11 inches to about 13 inches, a thickness within a range from about 0.030 inches to about 0.060 inches, and a flatness of about 0.010 inches or less. The thermal conductivity may be about 180 W/m-K or greater, and in some examples, the thermal conductivity may be about 190 W/m-K or greater. The thickness may be within a range from about 0.035 inches to about 0.050 inches. In one example, the thickness may be about 0.040 inches. The flatness may be about 0.008 inches or less, such as about 0.006 inches or less. In another example, the diameter of the aluminum nitride ceramic wafer may be within a range from about 11.2 inches to about 12.8 inches, preferably, from about 11.5 inches to about 12.5 inches, such as about 11.8 inches.

In another embodiment, an aluminum nitride ceramic cover substrate is provided which includes an aluminum nitride ceramic wafer having a thermal conductivity of about 160 W/m-K or greater, a circular-shaped geometry, a thickness within a range from about 0.030 inches to about 0.060 inches, and a flatness of about 0.010 inches or less. The thermal conductivity may be within a range from about 160 W/m-K to about 200 W/m-K, preferably, about 180 W/m-K or greater, such as about 187 W/m-K. Examples provide that the thickness may be within a range from about 0.035 inches to about 0.050 inches. Also, the flatness may be about 0.008 inches or less, such as about 0.006 inches or less.

In one example, the aluminum nitride ceramic wafer may have a circular-shaped geometry and a diameter within a range from about 11 inches to about 13 inches, preferably, from about 11.2 inches to about 12.8 inches, and more preferably, from about 11.5 inches to about 12.5 inches, such as 11.8 inches. In another example, the aluminum nitride ceramic wafer may have a circular-shaped geometry and a diameter within a range from about 7 inches to about 9 inches, preferably, from about 7.2 inches to about 8.8 inches, and more preferably, from about 7.5 inches to about 8.5 inches, such as 7.8 inches. In another example, the aluminum nitride ceramic wafer may have a circular-shaped geometry and a diameter within a range from about 5 inches to about 7 inches, preferably, from about 5.2 inches to about 6.8 inches, and more preferably, from about 5.5 inches to about 6.5 inches, such as about 5.8 inches.

In another example, an aluminum nitride ceramic cover substrate is provided which includes an aluminum nitride ceramic wafer having a thermal conductivity of about 185 W/m-K or greater, a circular-shaped geometry having a diameter of about 11.5 inches or greater, a thickness within a range from about 0.030 inches to about 0.060 inches, and a flatness of about 0.008 inches or less.

Examples provide that the aluminum nitride ceramic wafer may have a top surface with a smoothness of about 120 microinches or less, preferably, about 100 microinches or less, preferably, about 80 microinches or less, preferably, about 50 microinches or less, and more preferably, about 10 microinches or less. Some examples provide that the top surface of the aluminum nitride ceramic cover substrate has a mirror finish.

The aluminum nitride ceramic wafer contains at least aluminum and nitrogen, but also may contain other materials or elements, such as oxygen, yttrium, scandium, erbium, beryllium, titanium, zirconium, hafnium, vanadium, niobium, tantalum, chromium, molybdenum, tungsten, alloys thereof, derivatives thereof, or combinations thereof. The composition of the aluminum nitride ceramic wafer contains aluminum nitride, and may vary by further containing aluminum oxide or alumina, yttrium oxide or yttria, scandium oxide, erbium oxide, beryllium oxide, titanium oxide, zirconium oxide, hafnium oxide, vanadium oxide, niobium oxide, tantalum oxide, chromium oxide, molybdenum oxide, tungsten oxide, alloys thereof, or combinations thereof. In one embodiment, the aluminum nitride ceramic wafer contains about 90 wt % (weight percent) or greater of aluminum nitride, preferably, about 95 wt % or greater, and more preferably, about 98 wt % or greater. In an alternative embodiment, the aluminum nitride ceramic wafer may contain less than about 90 wt % of aluminum nitride.

In other embodiments, a beryllium oxide ceramic cover substrate is provided which includes a beryllium oxide ceramic wafer having a thermal conductivity of greater than 200 W/m-K, a circular-shaped geometry comprising a diameter within a range from about 11 inches to about 13 inches, a thickness within a range from about 0.030 inches to about 0.060 inches, and a flatness of about 0.010 inches or less. The thermal conductivity may be greater than about 250 W/m-K, and in some examples, the thermal conductivity may be greater than about 300 W/m-K, such as about 330 W/m-K or 350 W/m-K. The thickness may be within a range from about 0.035 inches to about 0.050 inches. In one example, the thickness may be about 0.040 inches. The flatness may be about 0.008 inches or less, such as about 0.006 inches or less. In another example, the diameter of the beryllium oxide wafer may be within a range from about 11.5 inches to about 12.5 inches, such as about 11.8 inches.

In another embodiment, a beryllium oxide ceramic cover substrate is provided which includes a beryllium oxide ceramic wafer having a thermal conductivity of about 200 W/m-K or greater, a circular-shaped geometry, a thickness within a range from about 0.030 inches to about 0.060 inches, and a flatness of about 0.010 inches or less. The thermal conductivity may be within a range from about 200 W/m-K to about 350 W/m-K, preferably, greater than about 250 W/m-K, more preferably, greater than about 300 W/m-K, such as about 330 W/m-K. Examples provide that the thickness may be within a range from about 0.035 inches to about 0.050 inches. Also, the flatness may be about 0.008 inches or less, such as about 0.006 inches or less.

In one example, the beryllium oxide ceramic wafer may have a circular-shaped geometry and a diameter within a range from about 11 inches to about 13 inches, preferably, from about 11.2 inches to about 12.8 inches, and more preferably, from about 11.5 inches to about 12.5 inches, such as 11.8 inches. In another example, the beryllium oxide ceramic wafer may have a circular-shaped geometry and a diameter within a range from about 7 inches to about 9 inches, preferably, from about 7.2 inches to about 8.8 inches, and more preferably, from about 7.5 inches to about 8.5 inches, such as 7.8 inches. In another example, the beryllium oxide ceramic wafer may have a circular-shaped geometry and a diameter within a range from about 5 inches to about 7 inches, preferably, from about 5.2 inches to about 6.8 inches, and more preferably, from about 5.5 inches to about 6.5 inches, such as about 5.8 inches.

In another example, a beryllium oxide ceramic cover substrate is provided which includes a beryllium oxide ceramic wafer having a thermal conductivity of about 250 W/m-K or greater, a circular-shaped geometry having a diameter of about 11.5 inches or greater, a thickness within a range from about 0.030 inches to about 0.060 inches, and a flatness of about 0.008 inches or less.

Examples provide that the beryllium oxide ceramic wafer may have a top surface with a smoothness of about 120 microinches or less, preferably, about 100 microinches or less, more preferably, about 80 microinches or less, more preferably, about 50 microinches or less, and more preferably, about 10 microinches or less. Some examples provide that the top surface of the beryllium oxide ceramic wafer has a mirror finish.

The beryllium oxide ceramic wafer contains at least beryllium and oxygen, but also may contain other elements, such as nitrogen, yttrium, scandium, erbium, aluminum, titanium, zirconium, hafnium, vanadium, niobium, tantalum, chromium, molybdenum, tungsten, alloys thereof, derivatives thereof, or combinations thereof. The composition of the beryllium oxide ceramic wafer contains beryllium oxide (BeO), and may vary by further containing aluminum nitride, aluminum oxide or alumina, yttrium oxide or yttria, scandium oxide, erbium oxide, titanium oxide, zirconium oxide, hafnium oxide, vanadium oxide, niobium oxide, tantalum oxide, chromium oxide, molybdenum oxide, tungsten oxide, alloys thereof, or combinations thereof. In one embodiment, the beryllium oxide ceramic wafer contains about 95 wt % (weight percent) or greater of beryllium oxide, preferably, about 98 wt % or greater, preferably, about 99 wt % or greater, preferably, about 99.5 wt % or greater, and more preferably, about 99.9 wt % or greater. In an alternative embodiment, the beryllium oxide ceramic wafer may contain less than about 90 wt % of beryllium oxide.

In other embodiments, the aluminum nitride ceramic wafer or the beryllium oxide ceramic wafer is chosen to have a dielectric value sufficient to alter the electromagnetic field to spread the plasma away from the susceptor during a cleaning operation, directing more of the plasma towards the walls of the chamber. The introduction of the aluminum nitride ceramic wafer or the beryllium oxide ceramic wafer into the chamber has a negative impact on the wafer throughput by adding the time required to load the ceramic wafer and then unload after the cleaning process. However, the redirecting of the plasma with the ceramic wafer reduces the cleaning time itself, more than making up for the amount of time required for handling of the ceramic wafer. The methods described herein may be used to increase the lifetime of a susceptor and decrease the number of times the susceptor has to be replaced, thereby reducing down time of a chamber, and thereby increasing wafer throughput.

DETAILED DESCRIPTION

Figure 1:
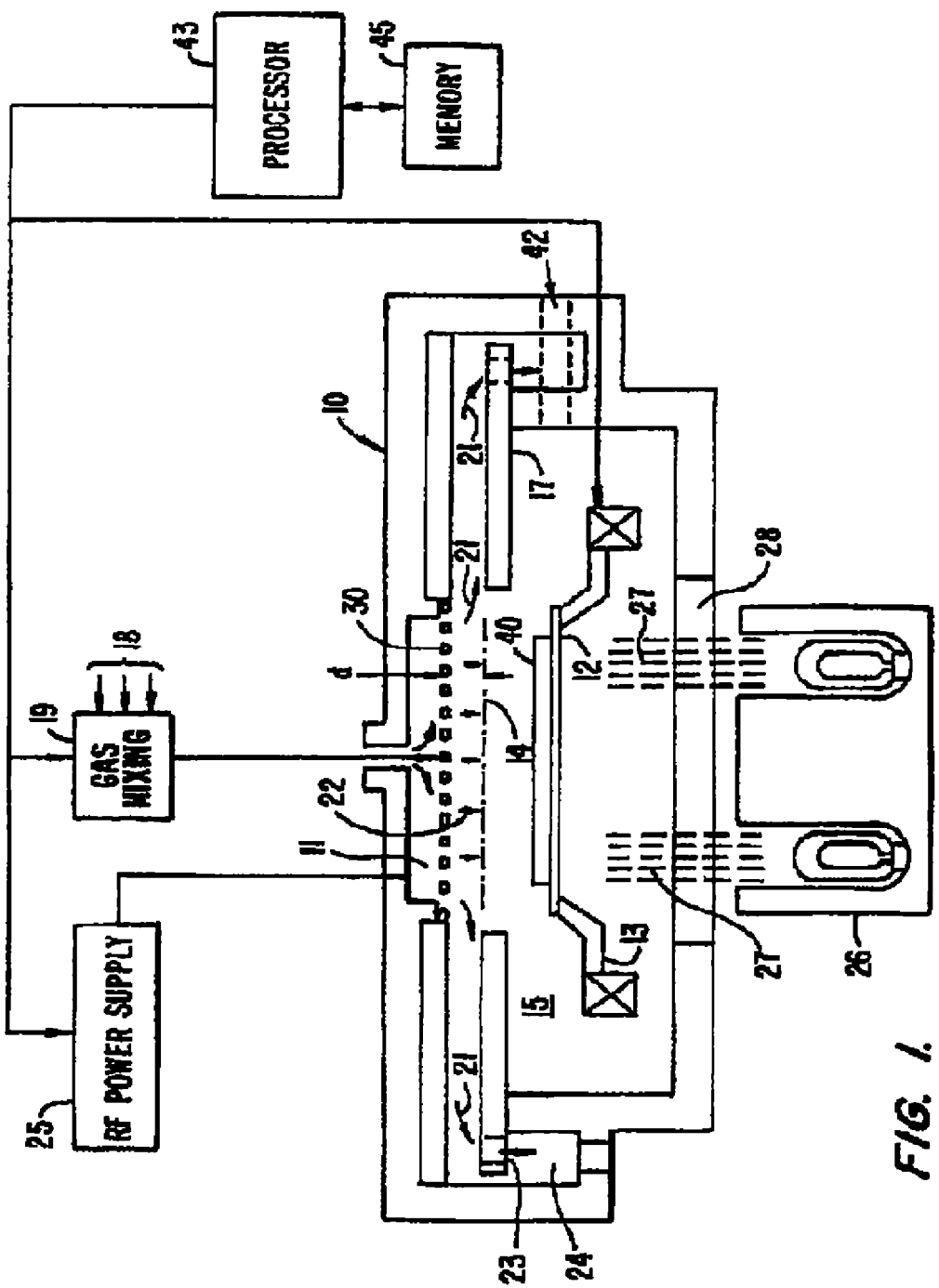
FIG. 1 is a sectional diagram of a processing chamber including the aluminum nitride ceramic wafer as described in embodiments herein.

FIG. 1 depicts a suitable processing chamber for performing the methods described in embodiments. FIG. 1 which is a vertical, cross-sectional view of processing chamber 10, which is a simplified, parallel plate chemical vapor deposition (CVD) reactor having vacuum chamber 15. Processing chamber 10 contains gas inlet manifold 11 for dispersing deposition gases to a substrate or wafer that rests on susceptor 12. Susceptor 12 is highly thermally responsive and is mounted on support fingers 13 so that susceptor 12 (and the wafer supported on the upper surface of susceptor 12) can be controllably moved between a lower loading/off-loading position and an upper processing position 14 which is closely adjacent gas inlet manifold 11.

When susceptor 12 and the wafer are in processing position 14, they are surrounded by baffle plate 17 having a plurality of spaced holes 23 which exhaust into annular vacuum manifold 24. During processing, the gas flows through holes 30 of gas inlet manifold 11 and is uniformly distributed radially across the surface or the wafer as indicated by arrows 21 and 22. The gas is then exhausted via spaced holes 23 into the circular vacuum manifold 24 by a vacuum pump system (not shown). Before reaching gas inlet manifold 11, deposition and carrier gases are input through gas lines 18 into gas mixing system 19 where they are combined and then sent to gas inlet manifold 11.

The deposition process performed in processing chamber 10 can be either a thermal process or a plasma enhanced process. In a plasma process, a controlled plasma is formed adjacent to the wafer by RF energy applied to gas inlet manifold 11 from RF power supply 25. Gas inlet manifold 11 is also an RF electrode, while susceptor 12 is grounded. RF power supply 25 can supply either single or dual frequency RF power to gas inlet manifold 11 to enhance the decomposition of reactive species introduced into vacuum chamber 15.

An external lamp module 26 provides a collimated annular pattern of light 27 through quartz window 28 onto an annular outer peripheral portion of susceptor 12. Such heat distribution compensates for the natural heat loss pattern of the susceptor and provides rapid thermal and uniform susceptor and wafer heating for effecting deposition.

Typically, any or all of the chamber lining, gas inlet manifold faceplate, support fingers 13, and various other pieces of reactor hardware may be made out of material such as anodized aluminum. An example of such a CVD apparatus is described in commonly assigned U.S. Pat. No. 5,000,113, which is herein incorporated by reference in its entirety.

Ceramic wafer 40 is shown placed on susceptor 12 and may contain an aluminum nitride ceramic wafer, a beryllium oxide ceramic wafer, or combinations thereof. Ceramic wafer 40 protects susceptor 12 from fluorine gases injected into the chamber through gas inlet manifold 11 during a cleaning operation. Ceramic wafer 40 of aluminum nitride or beryllium oxide acts as a dielectric, limiting the RF field between gas inlet manifold 11 and susceptor 12, thus spreading the plasma and redirecting the plasma towards the walls of the chamber and other aspects of the chamber which need to be cleaned. It has been observed in experimental results that this spreading effect reduces the cleaning time by 50%.

A processor 43 under the control of a program stored in a memory 45 may be used to operate the chamber of FIG. 1, including the RF power supply 25, gas inlet manifold 11, gas mixing system 19, and the raising and lowering of susceptor 12. The processor can also control the insertion and removal of ceramic wafer 40 of aluminum nitride or beryllium oxide via the apparatus shown in FIG. 2.

Figure 2:
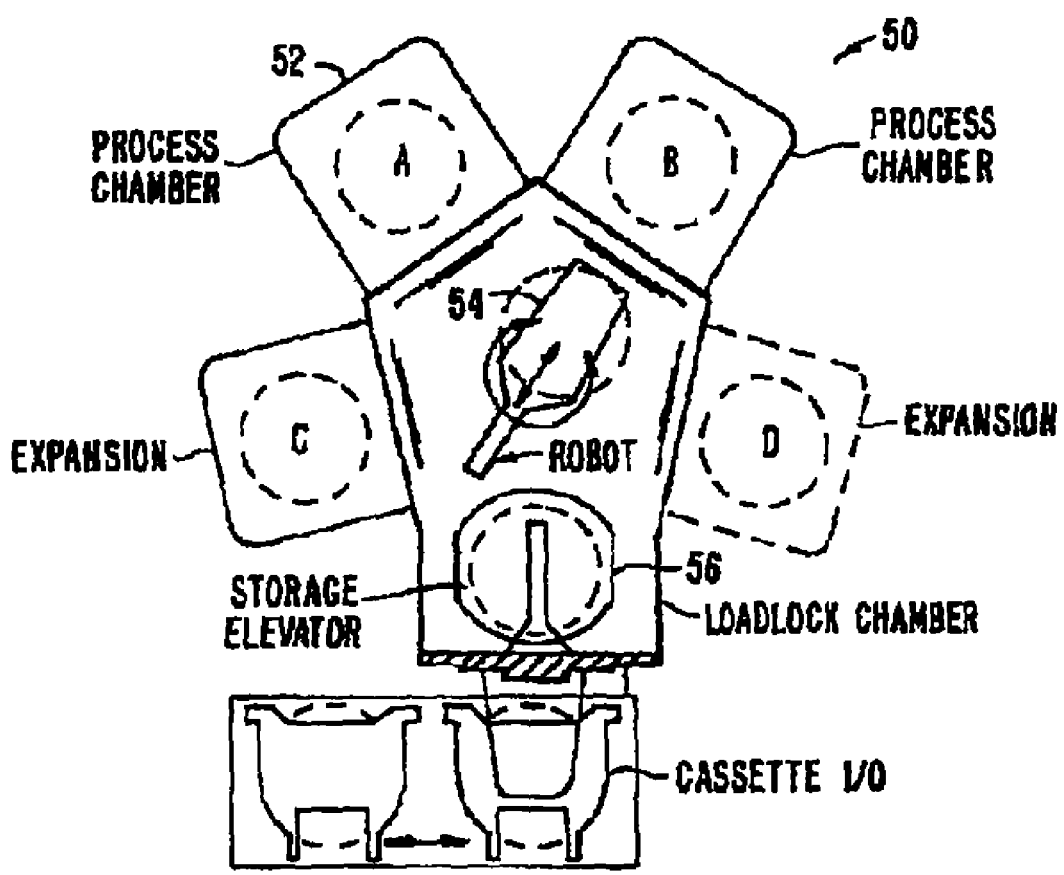
FIG. 2 is a diagram illustrating the robot and wafer storage elevator for handling the aluminum nitride ceramic wafer.

FIG. 2 shows a diagram of the apparatus for loading ceramic wafer 40 of aluminum nitride or beryllium oxide and storing the ceramic wafer between uses. FIG. 2 shows a processing system 50 which includes a processing chamber 52, such as the one shown in FIG. 1. A robot arm 54 is used to load ceramic wafer 40 from a storage elevator 56. Storage elevator 56 holds a number of wafers in-between process steps, and may also be used to hold ceramic wafer 40 of aluminum nitride or beryllium oxide as described in embodiments herein. Ceramic wafer 40 may be transferred by the robot arm 54 between processing chamber 52 and storage elevator 56.

Figure 3:
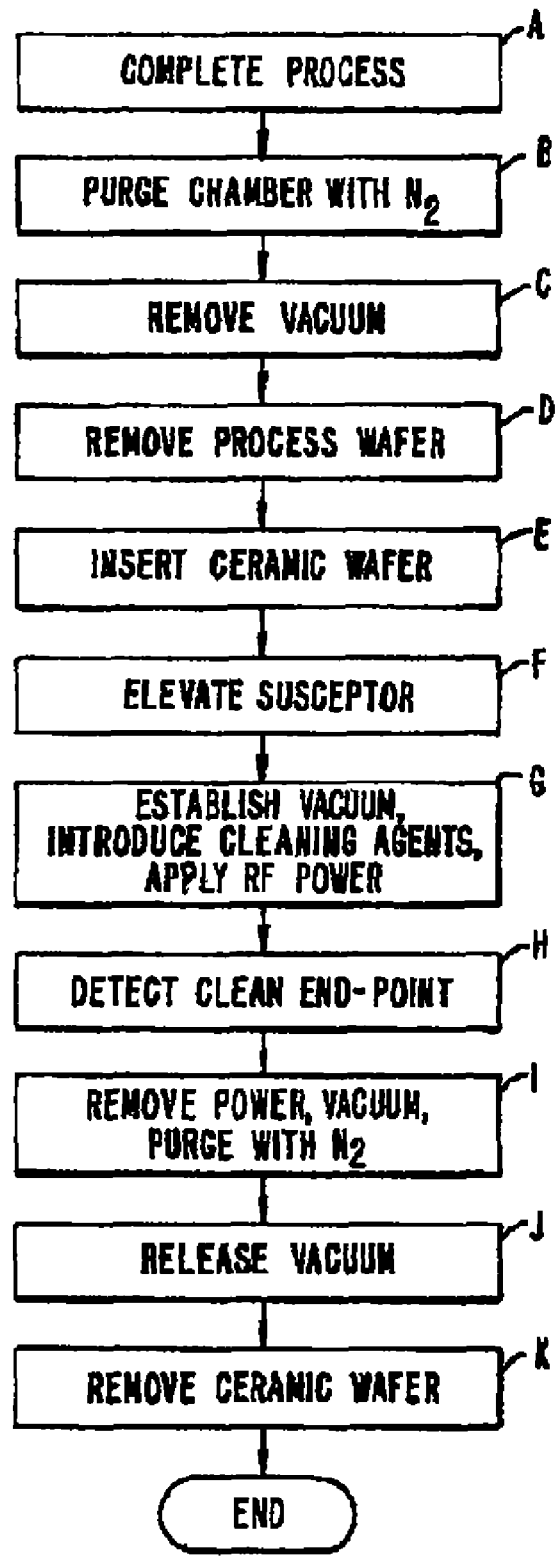
FIG. 3 is a flowchart illustrating a cleaning process as described in embodiments herein.

FIG. 3 is a flowchart illustrating a cleaning process according to embodiments herein. The cleaning steps may be controlled by processor 43 pursuant to a program in memory 45. After a final processing step on a wafer being processed is completed and the RF power is turned off by a command from processor 43 to RF power supply 25 (step A), the chamber is purged with an inert gas, such as nitrogen, by control of appropriate valves in gas mixing system 19 in response to a command from processor 43 (step B). After the last of the purge gases has been removed by the vacuum pump, the vacuum is turned off by controlling a vacuum valve with processor 43 (step C) and the wafer is removed from the chamber (step D) by robot arm 54 in response to a command from the processor and placed in storage elevator 56.

Ceramic wafer 40 is then retrieved from storage elevator 56 by robot arm 54 and placed into chamber 52 (step E). The wafer is inserted through a slot 42 in the side of the chamber of FIG. 1. The susceptor is then elevated to the desired height for the cleaning plasma by a motor controlled by the processor (step F) and the cleaning agents, typically including fluorine, are introduced into the chamber (step G) under the appropriate pressure and temperature conditions, as directed by commands from the processor to gas mixing system 19, vacuum throttle valve and susceptor heater.

An end point detector for detecting light emissions from fluorine gas is used to determine the end of the cleaning operation (step H). Alternately, a timed clean could be used. After the clean has been completed and the RF power turned off, again, an inert gas, such as nitrogen, is used to purge the chamber (step I). The vacuum is turned off (step J) and then the ceramic wafer of aluminum nitride or beryllium oxide is removed from the chamber (step K).

The cleaning process can be varied in a number of ways while still using the concepts of the present invention. For instance, a two step process could be used as set forth in commonly assigned U.S. Pat. No. 5,158,644, which is herein incorporated by reference in its entirety. In such a two step process, the susceptor is in the lowered position with the ceramic wafer and subject to a first cleaning operation. Subsequently, the ceramic wafer is removed, with the susceptor being raised closer to the gas discharge head for a second, local cleaning operation. In one embodiment, the two step cleaning process might be utilized only for periodic cleans, with a single step process being used for most of the cleaning processes, or vice versa.

The thickness and dielectric constant of the ceramic wafer of aluminum nitride or beryllium oxide can be varied in accordance with the chamber to be cleaned. In particular, if the chamber walls are covered with a ceramic liner, such as than set forth in commonly assigned U.S. Pat. No. 5,366,585, which is herein incorporated by reference in its entirety, the ceramic should be thicker, or have a lower dielectric constant, than a ceramic wafer used for an unlined chamber. This is because the ceramic liner directs the plasma away from the walls in such a lined chamber, and accordingly the ceramic wafer needs to be thicker or have a lower dielectric constant to redirect the plasma back to the walls, overcoming the insulating feature of the ceramic liner.

In one embodiment, the ceramic wafer contains an aluminum nitride ceramic cover substrate. The aluminum nitride ceramic cover substrate provides the wafer with a thermal conductivity of greater than 160 W/m-K. The thermal conductivity, as described herein, and unless otherwise indicated, is indicated or measured while the ceramic substrate is at room temperature (e.g., about 20° C.). In one example, the thermal conductivity may be within a range from about 160 W/m-K to about 200 W/m-K, preferably, about 180 W/m-K or greater, such as about 187 W/m-K or about 190 W/m-K or greater.

The aluminum nitride ceramic cover substrate contains at least aluminum and nitrogen, but also may contain other materials or elements, such as oxygen, yttrium, scandium, erbium, beryllium, titanium, zirconium, hafnium, vanadium, niobium, tantalum, chromium, molybdenum, tungsten, alloys thereof, derivatives thereof, or combinations thereof. The composition of the aluminum nitride ceramic wafer may vary and include aluminum oxide or alumina, yttrium oxide or yttria, scandium oxide, erbium oxide, beryllium oxide, titanium oxide, zirconium oxide, hafnium oxide, vanadium oxide, niobium oxide, tantalum oxide, chromium oxide, molybdenum oxide, tungsten oxide, alloys thereof, or combinations thereof. In many embodiments, the aluminum nitride ceramic wafer contains about 90 wt % (weight percent) or more of aluminum nitride, preferably, about 95 wt % or more, and more preferably, about 98 wt % or more. For example, the aluminum nitride ceramic wafer may contain AlN CERALLOY® 1370-CS or AlN CERALLOY® 1370-DP, each material available from Ceradyne, Inc., located in Costa Mesa, Calif. In an alternative embodiment, the aluminum nitride ceramic wafer may contain less than about 90 wt % of aluminum nitride.

In one example, a substrate or a wafer may have a circular-shaped geometry and have a diameter within a range from about 11 inches to about 13 inches, preferably, from about 11.2 inches to about 12.8 inches, more preferably, from about 11.5 inches to about 12.5 inches, such as about 11.8 inches. For example, if 12 inch diameter wafers are being processed, a 12 inch diameter ceramic wafer could be used. In another example, the substrate or the wafer may have a diameter within a range from about 7 inches to about 9 inches, preferably, from about 7.2 inches to about 8.8 inches, more preferably, from about 7.5 inches to about 8.5 inches, such as about 7.8 inches. In another example, the substrate or the wafer may have a diameter within a range from about 5 inches to about 7 inches, preferably, from about 5.2 inches to about 6.8 inches, more preferably, from about 5.5 inches to about 6.5 inches, such as about 5.8 inches. The thickness of the beryllium oxide ceramic wafer may be within a range from about 0.030 inches to about 0.060 inches, preferably, from about 0.035 inches to about 0.050 inches, for example, about 0.040 inches.

The aluminum nitride ceramic wafer may have a small flatness value in order to assist in preventing thermal cracking of the wafer. Since the chuck on the pedestal is deemed flat, the aluminum nitride ceramic wafer should be as equally flat in order to make contact with as much of the chuck as possible. During a process, the chuck is cooled while the wafer is heated. The wafer will become hotter at points in contact with the chuck than at points not in contact with the chuck. Therefore, the aluminum nitride ceramic wafer is more likely to become stressed due to uneven thermal gradient throughout the aluminum nitride material, which eventually may lead to the cracking of the ceramic substrate. The flatness may be about 0.010 inches or less, preferably, about 0.008 inches or less, such as about 0.006 inches or less.

Examples provide that the aluminum nitride ceramic wafer may have a top surface with a smoothness of about 120 microinches or less, preferably, about 100 microinches or less, more preferably, about 80 microinches or less, more preferably, about 50 microinches or less, and more preferably, about 10 microinches or less. Some examples provide that the top surface has a mirror finish.

In another embodiment, a beryllium oxide ceramic cover substrate is provided which includes a beryllium oxide ceramic wafer having a thermal conductivity of about 200 W/m-K or greater, a circular-shaped geometry, a thickness within a range from about 0.030 inches to about 0.060 inches, and a flatness of about 0.010 inches or less. The thermal conductivity may be within a range from about 200 W/m-K to about 350 W/m-K, preferably, greater than about 250 W/m-K, more preferably, greater than about 300 W/m-K, such as about 330 W/m-K.

The beryllium oxide ceramic wafer contains at least beryllium and oxygen, but also may contain other materials or elements, such as nitrogen, yttrium, scandium, erbium, aluminum, titanium, zirconium, hafnium, vanadium, niobium, tantalum, chromium, molybdenum, tungsten, alloys thereof, derivatives thereof, or combinations thereof. The composition of the beryllium oxide ceramic wafer contains beryllium oxide (BeO), and may vary by further containing aluminum nitride, aluminum oxide or alumina, yttrium oxide or yttria, scandium oxide, erbium oxide, titanium oxide, zirconium oxide, hafnium oxide, vanadium oxide, niobium oxide, tantalum oxide, chromium oxide, molybdenum oxide, tungsten oxide, alloys thereof, or combinations thereof. In one embodiment, the beryllium oxide ceramic wafer contains about 95 wt % (weight percent) or greater of beryllium oxide, preferably, about 98 wt % or greater, preferably, about 99 wt % or greater, preferably, about 99.5 wt % or greater, and more preferably, about 99.9 wt % or greater. In an alternative embodiment, the beryllium oxide ceramic wafer may contain less than about 90 wt % of beryllium oxide.

In one example, a substrate or a wafer may have a circular-shaped geometry and have a diameter within a range from about 11 inches to about 13 inches, preferably, from about 11.2 inches to about 12.8 inches, more preferably, from about 11.5 inches to about 12.5 inches, such as about 11.8 inches. For example, if 12 inch diameter wafers are being processed, a 12 inch diameter ceramic wafer could be used. In another example, the substrate or the wafer may have a diameter within a range from about 7 inches to about 9 inches, preferably, from about 7.2 inches to about 8.8 inches, more preferably, from about 7.5 inches to about 8.5 inches, such as about 7.8 inches. In another example, the substrate or the wafer may have a diameter within a range from about 5 inches to about 7 inches, preferably, from about 5.2 inches to about 6.8 inches, more preferably, from about 5.5 inches to about 6.5 inches, such as about 5.8 inches. The thickness of the beryllium oxide ceramic wafer may be within a range from about 0.030 inches to about 0.060 inches, preferably, from about 0.035 inches to about 0.050 inches, for example, about 0.040 inches.

The beryllium oxide ceramic wafer may have a small flatness value in order to assist in preventing thermal cracking of the wafer. Since the chuck on the pedestal is deemed flat, the beryllium oxide ceramic wafer should be as equally flat in order to make contact with as much of the chuck as possible. During a process, the chuck is cooled while the wafer is heated. The wafer will become hotter at points in contact with the chuck than at points not in contact with the chuck. Therefore, the beryllium oxide ceramic wafer is more likely to become stressed due to uneven thermal gradient throughout the beryllium oxide material, which eventually may lead to the cracking of the ceramic substrate. The flatness may be about 0.010 inches or less, preferably, about 0.008 inches or less, such as about 0.006 inches or less.

Examples provide that the beryllium oxide ceramic wafer may have a top surface with a smoothness of about 120 microinches or less, preferably, about 100 microinches or less, more preferably, about 80 microinches or less, more preferably, about 50 microinches or less, and more preferably, about 10 microinches or less. Some examples provide that the top surface has a mirror finish.

The ceramic wafer is itself periodically replaced or cleaned to avoid its introducing contaminants into the chamber during the cleaning process due to residue build up on the ceramic wafer. However, thousands of cleaning operations may be performed without such a wafer cleaning or replacement being necessary.

As will be understood by those of skill in the art, embodiments of the invention may be embodied in other specific forms without departing from the spirit or essential characteristics thereof. For example, a wafer which is only partially ceramic, has a ceramic coating, or has some other alloy or material which has dielectric properties similar to ceramic could be used. The dielectric constant of the aluminum nitride ceramic wafer and its thickness could be varied not only in accordance with the chamber characteristics, but also with the height of the susceptor used during the plasma cleaning process. Although the described embodiment is a CVD chamber, the invention could apply to any chamber where deposits build up, such as a PVD chamber, an ALD chamber, or an etching chamber.

While the foregoing is directed to embodiments of the invention, other and further embodiments of the invention may be devised without departing from the basic scope thereof, and the scope thereof is determined by the claims that follow.

The invention claimed is:

1. An aluminum nitride ceramic cover substrate, comprising:
    an aluminum nitride ceramic wafer comprising an upper surface and a lower surface and having a thermal conductivity of greater than 160 W/m-K;
    a circular-shaped geometry comprising a diameter within a range from about 11 inches to about 13 inches;
    a thickness between the upper and lower surfaces within a range from about 0.035 inches to about 0.050 inches; and
    a flatness of the lower surface deviates by about 0.010 inches or less.

2. The aluminum nitride ceramic cover substrate of claim 1, wherein the thermal conductivity is about 180 W/m-K or greater.

3. The aluminum nitride ceramic cover substrate of claim 1, wherein the thickness is about 0.040 inches.

4. The aluminum nitride ceramic cover substrate of claim 3, wherein the flatness is about 0.006 inches or less.

5. The aluminum nitride ceramic cover substrate of claim 1, wherein the upper surface of the aluminum nitride ceramic wafer further comprises a surface roughness of about 120 microinches or less.

6. The aluminum nitride ceramic cover substrate of claim 5, wherein the surface roughness is about 10 microinches or less.

7. The aluminum nitride ceramic cover substrate of claim 5, wherein the upper surface has a mirror finish.

8. The aluminum nitride ceramic cover substrate of claim 1, wherein the aluminum nitride ceramic wafer further comprises beryllium, beryllium oxide, or derivatives thereof.

9. The aluminum nitride ceramic cover substrate of claim 1, wherein the aluminum nitride ceramic wafer further comprises erbium, erbium oxide, or derivatives thereof.

10. The aluminum nitride ceramic cover substrate of claim 1, wherein the aluminum nitride ceramic wafer further comprises yttrium, yttria, alumina, or derivatives thereof.

11. The aluminum nitride ceramic cover substrate of claim 1, wherein the aluminum nitride ceramic wafer further comprises a metal oxide containing a metal selected from the group consisting of titanium, zirconium, hafnium, vanadium, niobium, tantalum, chromium, molybdenum, tungsten, alloys thereof, derivatives thereof, and combinations thereof.

12. An aluminum nitride ceramic cover substrate, comprising:
    an aluminum nitride ceramic wafer comprising an upper surface and a lower surface and having a thermal conductivity of about 160 W/m-K or greater;
    a circular-shaped geometry;
    a thickness between the upper and lower surfaces within a range from about 0.035 inches to about 0.050 inches; and
    a flatness of the lower surface deviates by about 0.010 inches or less.

13. The aluminum nitride ceramic cover substrate of claim 12, wherein the thermal conductivity is within a range from about 160 W/m-K to about 200 W/m-K.

14. The aluminum nitride ceramic cover substrate of claim 12, wherein the circular-shaped geometry comprises a diameter within a range from about 11.2 inches to about 12.8 inches.

15. The aluminum nitride ceramic cover substrate of claim 12, wherein the circular-shaped geometry comprises a diameter within a range from about 7.2 inches to about 8.8 inches.

16. The aluminum nitride ceramic cover substrate of claim 12, wherein the circular-shaped geometry comprises a diameter within a range from about 5.2 inches to about 6.8 inches.

17. A beryllium oxide ceramic cover substrate, comprising:
    a beryllium oxide ceramic wafer comprising an upper surface and a lower surface and having a thermal conductivity of about 200 W/m-K or greater;
    a thickness between the upper and lower surfaces within a range from about 0.035 inches to about 0.050 inches; and
    a flatness of the lower surface deviates by about 0.010 inches or less.

18. The beryllium oxide ceramic cover substrate of claim 17, wherein the thermal conductivity is about 250 W/m-K or greater.

19. The beryllium oxide ceramic cover substrate of claim 18, wherein the thermal conductivity is about 330 W/m-K or greater.

* * * * *

UNITED STATES PATENT AND TRADEMARK OFFICE
CERTIFICATE OF CORRECTION

PATENT NO. : 8,252,410 B2  
APPLICATION NO. : 12/204240  
DATED : August 28, 2012  
INVENTOR(S) : Rasheed It is certified that error appears in the above-identified patent and that said Letters Patent is hereby corrected as shown below:

In Detailed Description:

Column 7, Line 35, please delete "AIN" and insert --AlN-- therefor;

Column 7, Line 35, please delete "AIN" and insert --AlN-- therefor;

In the Claims:

Column 9, Claim 1, Line 48, please delete "11inches" and insert --11 inches-- therefor;

Column 10, Claim 14, Line 38, please delete "11.2inches" and insert --11.2 inches-- therefor;

Column 10, Claim 15, Line 42, please delete "7.2inches" and insert --7.2 inches-- therefor;

Column 10, Claim 16, Line 45, please delete "5.2inches" and insert --5.2 inches-- therefor.

Signed and Sealed this  
Thirteenth Day of November, 2012

David J. Kappos  
*Director of the United States Patent and Trademark Office*